United States Patent
Yamagata et al.

(10) Patent No.: US 8,564,692 B2
(45) Date of Patent: Oct. 22, 2013

(54) ELECTRONIC DEVICE, ELECTRONIC CAMERA, AND DATA TRANSFER PROGRAM FOR CHANGING TRANSFER RATE AND COMMUNICATION PROTOCOL

(75) Inventors: Naoki Yamagata, Shiki (JP); Masaki Hayashi, Chiba (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/137,830

(22) Filed: Sep. 15, 2011

(65) Prior Publication Data

US 2012/0007994 A1    Jan. 12, 2012

Related U.S. Application Data

(63) Continuation of application No. 12/081,480, filed on Apr. 16, 2008, now abandoned.

(30) Foreign Application Priority Data

Apr. 19, 2007    (JP) ................................. 2007-110069

(51) Int. Cl.
*H04N 5/76* (2006.01)
*G06F 13/00* (2006.01)

(52) U.S. Cl.
USPC ...................... 348/231.99; 348/231.6; 710/33

(58) Field of Classification Search
None
See application file for complete search history.

(56) References Cited

U.S. PATENT DOCUMENTS

| | | | |
|---|---|---|---|
| 7,379,090 B2 * | 5/2008 | Katayama | 348/207.1 |
| 7,725,621 B2 * | 5/2010 | Mutaguchi | 710/22 |
| 7,832,639 B2 * | 11/2010 | Yoshida | 235/439 |
| 2005/0033917 A1 * | 2/2005 | Takeuchi | 711/115 |

FOREIGN PATENT DOCUMENTS

| | | |
|---|---|---|
| JP | A-02-116233 | 4/1990 |
| JP | A-08-029510 | 2/1996 |
| JP | A-08-293895 | 11/1996 |
| JP | A-11-045157 | 2/1999 |
| JP | A-11-249821 | 9/1999 |
| JP | A-2002-215333 | 8/2002 |
| JP | A-2003-216570 | 7/2003 |
| JP | A-2003-323397 | 11/2003 |
| JP | A-2004-032278 | 1/2004 |
| JP | A-2004-334578 | 11/2004 |
| JP | A-2005-174203 | 6/2005 |

(Continued)

OTHER PUBLICATIONS

Office Action mailed on Aug. 16, 2011 in corresponding Japanese Application No. 2007-110069. (with English language translation).

(Continued)

*Primary Examiner* — Justin P Misleh
(74) *Attorney, Agent, or Firm* — Oliff & Berridge, PLC

(57) ABSTRACT

An electronic device includes: a data transfer unit that transfers data between a first recording medium and a second recording medium; an indication unit that indicates a communication protocol and a data transfer rate to be used in data transfer to the transfer unit; a judgment unit that judges whether or not the data transfer is successful; a control unit that controls the indication unit to indicate a communication protocol and a data transfer rate to be used in data transfer, after the judgment whether or not the data transfer is successful, based on the communication protocol used in the data transfer, the data transfer rate used in the data transfer, and the judgment whether or not the data transfer is successful.

12 Claims, 6 Drawing Sheets

| TRANSFER RATE | COMMUNICATION METHOD |
|---|---|
| FASTER ↑ | UDMA Mode6 |
| | UDMA Mode5 |
| | UDMA Mode4 |
| | UDMA Mode3 |
| | UDMA Mode2 |
| ↓ SLOWER | PIO |

(56) References Cited

FOREIGN PATENT DOCUMENTS

| | | |
|---|---|---|
| JP | A-2005-287029 | 10/2005 |
| JP | A-2006-067446 | 3/2006 |
| JP | A-2006-211022 | 8/2006 |
| WO | WO 2006/035738 A1 | 4/2006 |

OTHER PUBLICATIONS

Jul. 31, 2012 Office Action issued in Japanese Patent Application No. 2007-110069 with translation.

* cited by examiner

FIG.2

| TRANSFER RATE | COMMUNICATION METHOD |
|---|---|
| FASTER ↑<br><br>↓ SLOWER | UDMA Mode6<br>UDMA Mode5<br>UDMA Mode4<br>UDMA Mode3<br>UDMA Mode2<br>PIO |

ELECTRONIC DEVICE, ELECTRONIC CAMERA, AND DATA TRANSFER PROGRAM FOR CHANGING TRANSFER RATE AND COMMUNICATION PROTOCOL

INCORPORATION BY REFERENCE

This is a Continuation of application Ser. No. 12/081,480 filed Apr. 16, 2008, abandoned Sep. 16, 2011. The disclosure of the prior application is hereby incorporated by reference: Japanese Patent Application No. 2007-110069 filed Apr. 19, 2007.

BACKGROUND OF THE INVENTION

1. Field of the Invention

The present invention relates to an electronic device, an electronic camera, and a data transfer program.

2. Description of Related Art

Japanese Laid-Open Patent Application No. 2003-323397 discloses a technology with which when a data transfer error in an Ultra DMA mode occurs, a communication protocol is changed to a PIO mode. Japanese Laid-Open Patent Application No. H11-45157 discloses a technology with which when a data transfer error occurs, data transfer is performed at a transfer rate than a set transfer rate.

SUMMARY OF THE INVENTION

In constructing an electronic device or an electronic camera such that when a data transfer error has occurred, both transfer rate and communication protocol are changeable, there arises a problem how to combine their changes.

The electronic camera according to a first aspect of the present invention includes a data transfer unit that transfers data between a first recording medium and a second recording medium; an indication unit that indicates to the transfer unit a communication protocol and a data transfer rate to be used in data transfer; a judgment unit that judges whether or not the data transfer is successful; a control unit that controls the indication unit to indicate a communication protocol and a data transfer rate to be used in data transfer, after the judgment whether or not the data transfer is successful, based on the communication protocol used in the data transfer, the data transfer rate used in the data transfer, and the judgment whether or not the data transfer is successful.

It is preferred that the communication protocol to be used in the data transfer includes a higher rate communication protocol and a lower rate communication protocol that performs the data transfer in a transfer rate lower than that of the higher rate communication protocol, and at least one of the higher rate communication protocol and the lower rate communication protocol is adapted to be changeable with respect to data transfer rate.

It is preferred that the control unit controls the indication unit to decrease the data transfer rate without changing the communication protocol when it is judged by the judgment unit that data transfer with the communication protocol of which the data transfer rate is made changeable is unsuccessful.

It is preferred that the control unit controls the indication unit to change the higher rate communication protocol to the lower rate communication protocol when the data transfer is performed at a minimum data transfer rate of the higher rate communication protocol of which the data transfer rate is made changeable and it is judged by the judgment unit that the data transfer is unsuccessful.

It is preferred that the control unit controls the indication unit to increase the data transfer rate without changing the communication protocol when it is judged by the judgment unit that the data transfer with the communication protocol of which the data transfer rate is made changeable is successful.

It is preferred that the control unit controls the indication unit to change the lower rate communication to the higher rate communication when the data transfer is performed at a maximum data transfer rate of the lower rate communication protocol of which the data transfer rate is made changeable and it is judged by the judgment unit that the data transfer is successful.

It is preferred that the control unit controls the indication unit to increase the data transfer rate when a judgment by the judgment unit that the data transfer is successful is continuously made a predetermined number of times.

It is preferred that the control unit controls the indication unit to redo the data transfer according to the same communication protocol and at the same transfer rate as the communication protocol and the transfer rate at the time when it is judged by the judgment unit that the data transfer is unsuccessful because the judgment unit has detected an error upon a cyclic redundancy check.

It is preferred that the control unit controls the indication unit to decrease the data transfer rate when it is judged by the judgment unit that a judgment that the data transfer is unsuccessful is continuously made a predetermined number of times.

It is preferred that the control unit controls the indication unit to change the communication protocol to the lower rate communication protocol when it is judged by the judgment unit that the data transfer is unsuccessful because the judgment unit has detected an error upon a cyclic redundancy check and if the communication protocol used upon the judgment that the data transfer is unsuccessful is the higher rate communication protocol.

The electronic camera according to the second aspect of the present invention includes components of the electronic device according to the first aspect; and an image-capturing unit that captures an image of a subject to obtain image data and outputs the image data.

The computer-readable program product according to the third aspect of the present invention containing a program for controlling data transfer, the program comprising: a data transfer instruction for performing data transfer between a first recording medium and a second recording medium; an indication instruction for indicating a communication protocol and a data transfer rate to be used in the data transfer; a judgment instruction for judging whether or not the data transfer is successful; and a control instruction for controlling the indication instruction to indicate a communication protocol and a data transfer rate to be used in data transfer, after the judgment whether or not the data transfer is successful, based on the communication protocol used in the data transfer, the data transfer rate used in the data transfer, and the judgment whether or not the data transfer is successful.

BRIEF DESCRIPTION OF THE DRAWINGS

FIG. 2 is a diagram illustrating a method of communication used in data transfer;

DETAILED DESCRIPTION OF THE INVENTION

Hereinafter, a best mode for carrying out the present invention is described with reference to the attached drawings.

First Embodiment

Figure 1:
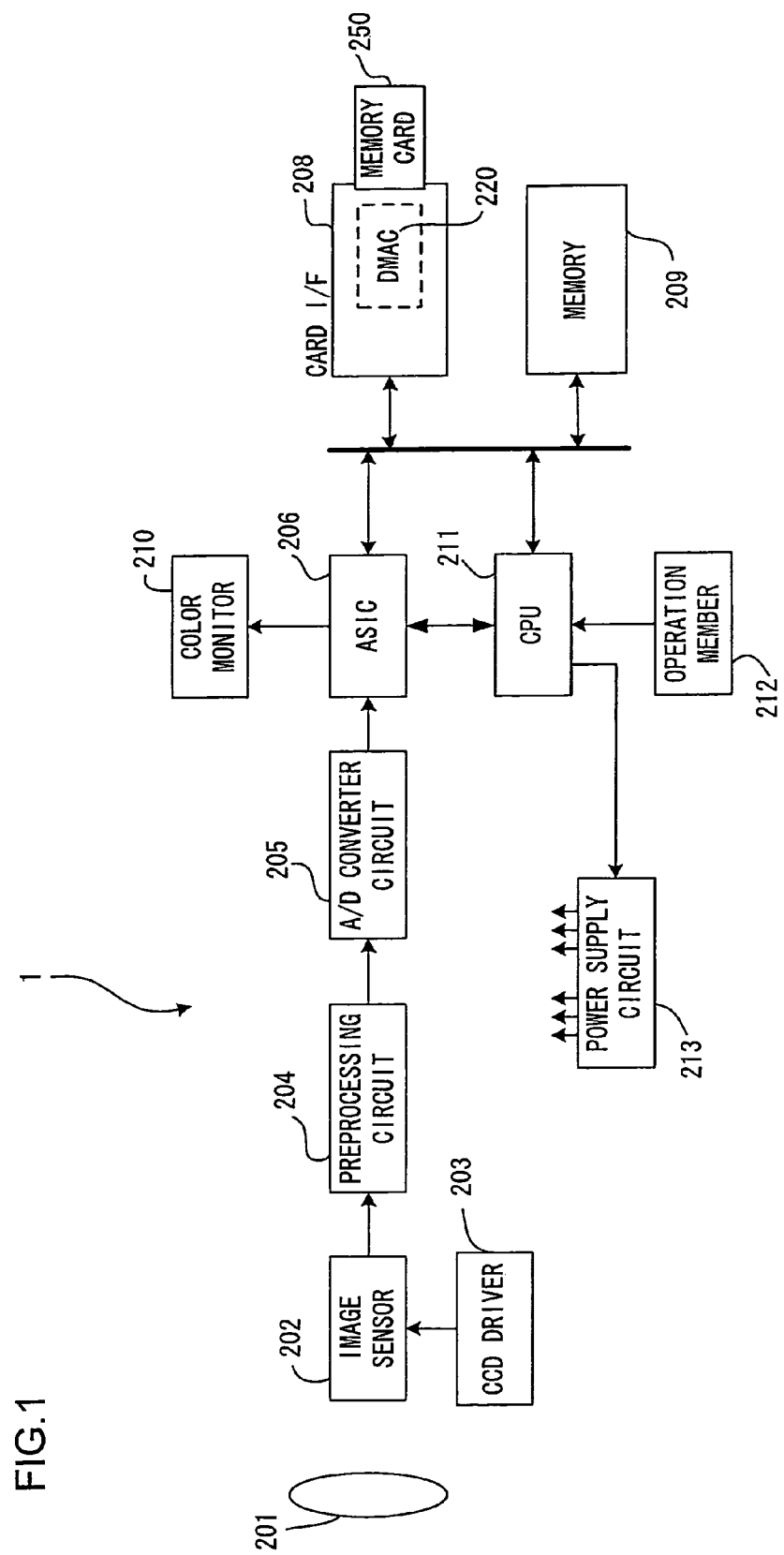
FIG. 1 is a block diagram illustrating a configuration of a main part of an electronic camera according to a first embodiment of the present invention.

FIG. 1 is a block diagram presenting a configuration of a main part of an electronic camera according to a first embodiment of the present invention. In FIG. 1, a electronic camera 1 includes a photographic lens 201, an image sensor 202, a CCD driver 203, a preprocessing circuit 204, an A/D converter circuit 205, an ASIC 206, a card I/F 208, a memory 209, a color monitor 210, a CPU 211, an operation member 212, and a power supply 213. The card I/F 208 is adapted so as to detachably attach a memory card 250 thereto.

The photographic lens 201 forms an image of a subject on an imaging plane of the image sensor 201. The image sensor 202 includes, for example, a CCD image sensor. The image sensor 202 captures an image of a subject to obtain analog image signals and outputs the analog image signals to the preprocessing circuit 204. The CCD driver 203 provides a predetermined drive signal or signals to the image sensor 202.

The preprocessing circuit 204 performs analog processing (gain control, etc.) on the analog image signals. The A/D converter circuit 205 converts the analog image signal after the analog processing into digital image signals. The digital image signals are output to the ASIC 206.

The ASIC 206 functions as an image processing circuit, which performs predetermined image processing on the input digital image signals to produce an image file. The image processing includes, for example, enhancement of contour and color temperature adjustment (white balance adjustment) processing, format conversion processing for image signals, and image compression processing. In addition, the ASIC 206 prepares display data for displaying the image file on the color monitor 210.

The color monitor 210, which includes a liquid crystal display panel, displays a reproduced image based on the display data input from the ASIC 206. The power supply circuit 213 supplies power necessary for each unit in the electronic camera 1. The operation member 212, which includes a user input device such as a release button or a reproduction button, outputs an operation signal from each user input device.

The CPU 211 sends an instruction to each unit in the electronic camera 1 in response to the operation signal input therein and controls photographing action and reproducing action of the electronic camera 1. The memory 209 temporarily records therein data before and after the image processing and data during the image processing. In addition, the memory 209 can be used as a buffer memory; the memory 209 records therein an image file before it is recorded into the memory card 250 or an image file read out from the memory card 250. The image file produced by the ASIC 206 is temporarily recorded in the memory 209 and then transferred to the memory card 250 through the card I/F 208 and recorded in the memory card 250. Since each image is temporarily recorded in the memory 209 for a certain period of time, even if there occurs a transfer error (an error that occurs upon transfer to and recording in the memory card 250) to be detailed below, transfer and recording of the image file can be redone again and again until success.

The card I/F 208, which includes a DMA (Direct Memory Access) controller 220, controls access to the memory card 250 in response to the instruction from the CPU 211.

Since the present embodiment is featured by data transfer between the memory card 250 and the memory 209, explanation is focused on the access to the memory card 250. The access to the memory card 250 is performed, for example, in a case where an image file is recorded in the memory card 250 and in a case where the image file recorded in the memory card 250 is read out therefrom.

FIG. 2 is a diagram illustrating a method of communication used by the electronic camera 1 in data transfer between the memory card 250 and the electronic camera 1. The electronic camera 1 uses any one communication method selected from, for example, six communication methods (inclusive of two types of communication protocols). One of the communication protocols is UDMA (Ultra DMA), which is standardized for data transmission and reception between memories or recording devices in a computer device. In the case of the transfer method according to UDMA (hereinafter, referred to as "UDMA method"), the DMA controller 220 manages data transfer and performs the data transfer directly without involving the CPU 211. Since CPU commands (machine language) are not used in the data transfer, a transfer rate higher than that of clock signals of the CPU 211 can be obtained. In the present embodiment, five ranks of communication method, i.e., from Mode 2 to Mode 6 are used as UDMA. The transfer rates of the five ranks of communication method are faster in the order of Mode 6>Mode 5>Mode 4>Mode 3>Mode 2.

The other of the communication protocols is a PIO (Programmed I/O) protocol, in which the CPU 211 manages data transfer between memories and recording devices. In case of the data transfer method by PIO (hereinafter, referred to as "PIO method"), the data is transferred through intermediary of CPU commands (machine language) and hence the transfer rate by the PIO method is lower than the transfer rate by the UDMA method. Accordingly, in the present embodiment, the UDMA method is used as a high rate communication protocol and the PIO method is used as a low rate communication protocol. Although the transfer rate can be changed in the PIO method by changing intervals of CPU commands, only one transfer rate for the PIO method is used in the present embodiment. Therefore, the electronic camera according to the present embodiment is adapted such that one communication method can be selected from six ranks of communication method obtained by summing up the above-mentioned five ranks of UDMA method and a single rank of PIO method. It is needless to say that the electronic camera may be adapted such that even in the PIO method, the transfer rate is changeable.

The communication control processing that the CPU 211 performs is described with reference to the flowchart shown in FIG. 3. As an example of the communication control processing shown in FIG. 3, processing of writing data to the memory card 250 is described. The CPU 211 performs the processing shown in FIG. 3 every time when a predetermined amount (for example, 128 K bytes) of data is transferred upon access to the memory card 250.

Figure 3:
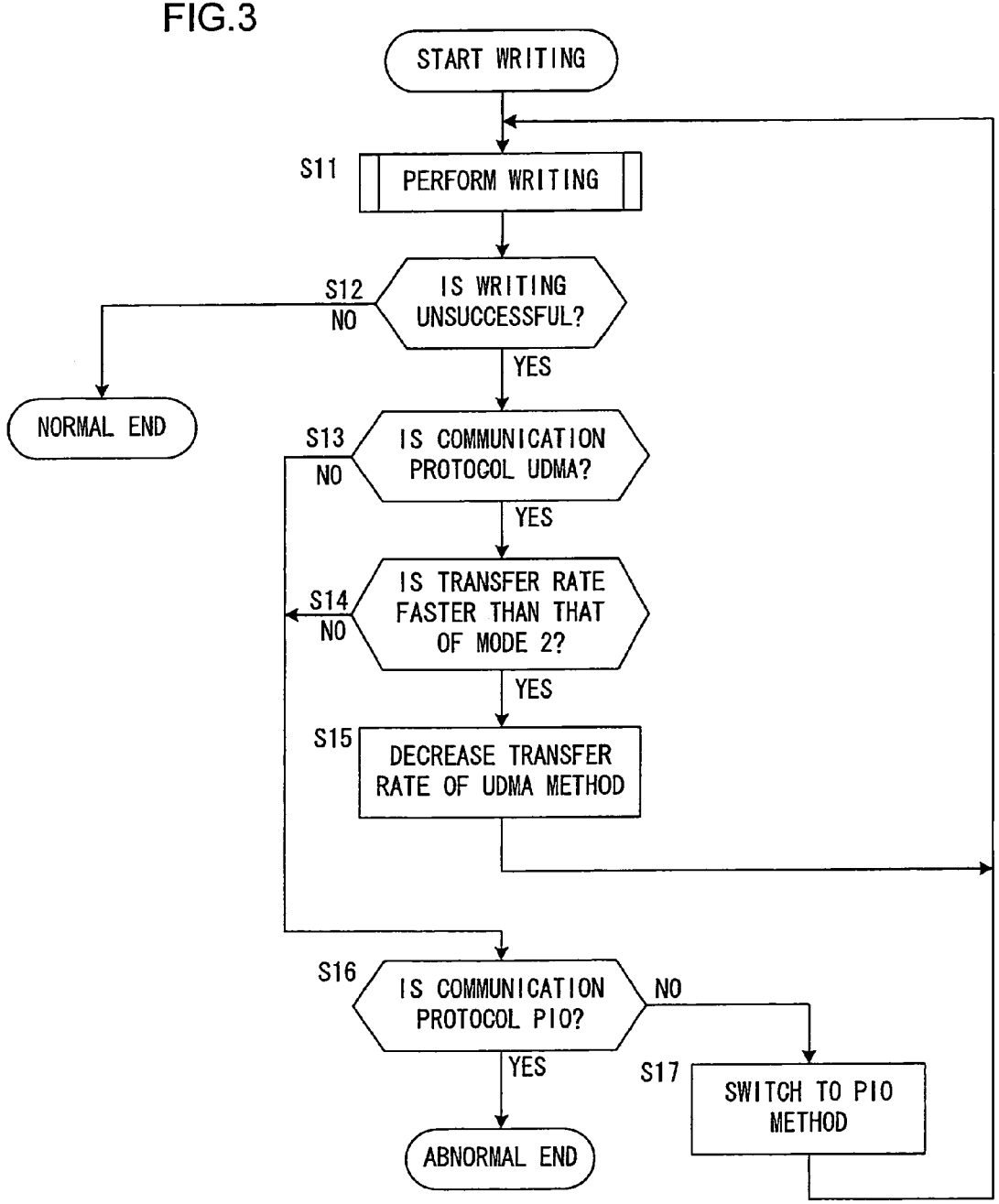
FIG. 3 is a flowchart illustrating communication control processing according to the first embodiment.

In a step S11 in FIG. 3, the CPU 211 sends an instruction to the card I/F 208 to perform data transfer (perform writing) to the memory card 250 and advances the process to a step S12. In the present embodiment, the electronic camera is adapted such that three modes of abnormality upon data transfer are discernible.

Mode 1

Occurrence of abnormality of Mode 1 means that handshake according to the selected communication protocol is normal (that is, communication is established) and abnormality occurs only in the transfer data. In other words, when an error is detected by performing CRC (Cyclic Redundancy Check), the CPU 211 judges that an abnormality of Mode 1 (hereinafter, referred to as "CRC error") has occurred. The CRC is one of error detection methods upon data transfer and detects errors by transmitting and receiving transfer data with a cyclic redundancy code for use in the detection of errors in advance.

Mode 2

When the handshake according to the selected communication protocol is normal (that is, communication is established) and error information is detected when a status information produced by the memory card 250 is obtained, the CPU 211 judges that an abnormality of Mode 2 has occurred.

Mode 3

When the handshake according to the selected communication protocol is abnormal (that is, communication is not established), the CPU 211 judges that an abnormality of Mode 3 has occurred.

In the step S12 in FIG. 3, the CPU 211 judges whether or not the writing is successful. The CPU makes an affirmative judgment on the step S12 if it is judged that at least one abnormality of Modes 1 to 3 mentioned above is observed and advances the process to a step S13. The CPU 211 makes a negative judgment on the step S12 if it is judged that no abnormality of Modes 1 to 3 mentioned above is observed and the processing shown in FIG. 3 is ended. When a negative judgment is made on the step S12, the writing is normal, so that data transfer to the memory card 250 is continued and data transfer of a next predetermined amount (in the present example, 128 Kbytes) is performed according to the same communication protocol and at the same transfer rate as ever.

In the step S13, the CPU 211 judges whether or not the current communication protocol is according to the UDMA method. When the current communication protocol is according to the UDMA method, the CPU 211 makes an affirmative judgment on the step S13 and advances the process to a step S14. The CPU 211 makes a negative judgment on the step S12 if it is judged that the current communication protocol is not according to the UDMA method and the CPU 211 advances the process to a step S16.

In the step S14, the CPU 211 judges whether or not the current transfer rate according to the UDMA method is faster than that of Mode 2. When the current transfer rate is the same as the transfer rate of one of the Modes 3 to 6, the CPU 211 makes an affirmative judgment on the step S14 and advances the process to a step S15. When the current transfer rate is the same as that of the Mode 2, the CPU 211 makes a negative judgment on the step S14 and advances the process to a step S16.

In the step S15, the CPU 211 sends an instruction to the card I/F 208 to decrease the current transfer rate according to the UDMA method by one rank and turns the process back to the step S11. As a result, the writing action (that is, writing action to write again the data of which previous writing action has been unsuccessful in the step S11) is performed at a rate by one rank lower.

In the step S16, the CPU 211 judges whether or not the current communication protocol is according to the PIO method. The CPU 211 makes an affirmative judgment on the step S16 if the current communication protocol is according to the PIO method and causes the processing shown in FIG. 3 to be ended. When the affirmative judgment is made on the step S16, some abnormality has occurred, so that the data transfer to the memory card 250 is stopped.

On the other hand, the CPU 211 makes a negative judgment on the step S16 if the current communication protocol is not according to the PIO method and advances the process to a step S17. In the step S17, the CPU 211 switches the communication protocol to one according to the PIO method and turns the process back to the step S11. As a result the writing is performed again according to the lower rate communication protocol.

According to the first embodiment mentioned above, the following advantages are obtainable.

(1) Upon the data transfer between the memory card 250 and the memory 209, the electronic camera 1 judges whether or not there occurs any abnormality in data transfer for every predetermined number of bytes. Based on the result of the judgment (whether the data transfer was successful or unsuccessful), the communication protocol and the transfer rate used upon the judgment, the communication protocol and transfer rate to be used in next data transfer are determined. Therefore, appropriate transfer conditions suitable for the actual data transfer state can be determined.

(2) Since the electronic camera 1 is adapted such that one of the higher rate communication protocol and the lower rate communication protocol is selected, there can be selected data transfer conditions that are more appropriate than the case where the same communication protocol is used and only the transfer rate is changed depending on the actual data transfer state. In addition, since the electronic camera is adapted such that the transfer rate according to each communication protocol is changeable, appropriate transfer conditions depending on the actual data transfer state can be selected.

(3) Since the electronic camera 1 is adapted such that when the data transfer is successful, the current transfer rate is maintained while when the data transfer is unsuccessful, the data transfer is tried again at a transfer rate by one rank lower than the current transfer rate (step S15), so that transfer conditions under which data transfer becomes more successful can be provided.

(4) In the case (3) above, the electronic camera 1 is adapted such that when the data transfer is unsuccessful, the data transfer using the higher communication protocol (UDMA method) proceeds at a minimum transfer rate, the communication protocol is switched to the lower rate communication protocol (PIO method) and the data transfer is redone (step S17), so that transfer conditions under which data transfer becomes much more successful can be provided.

Second Embodiment

Figure 4:
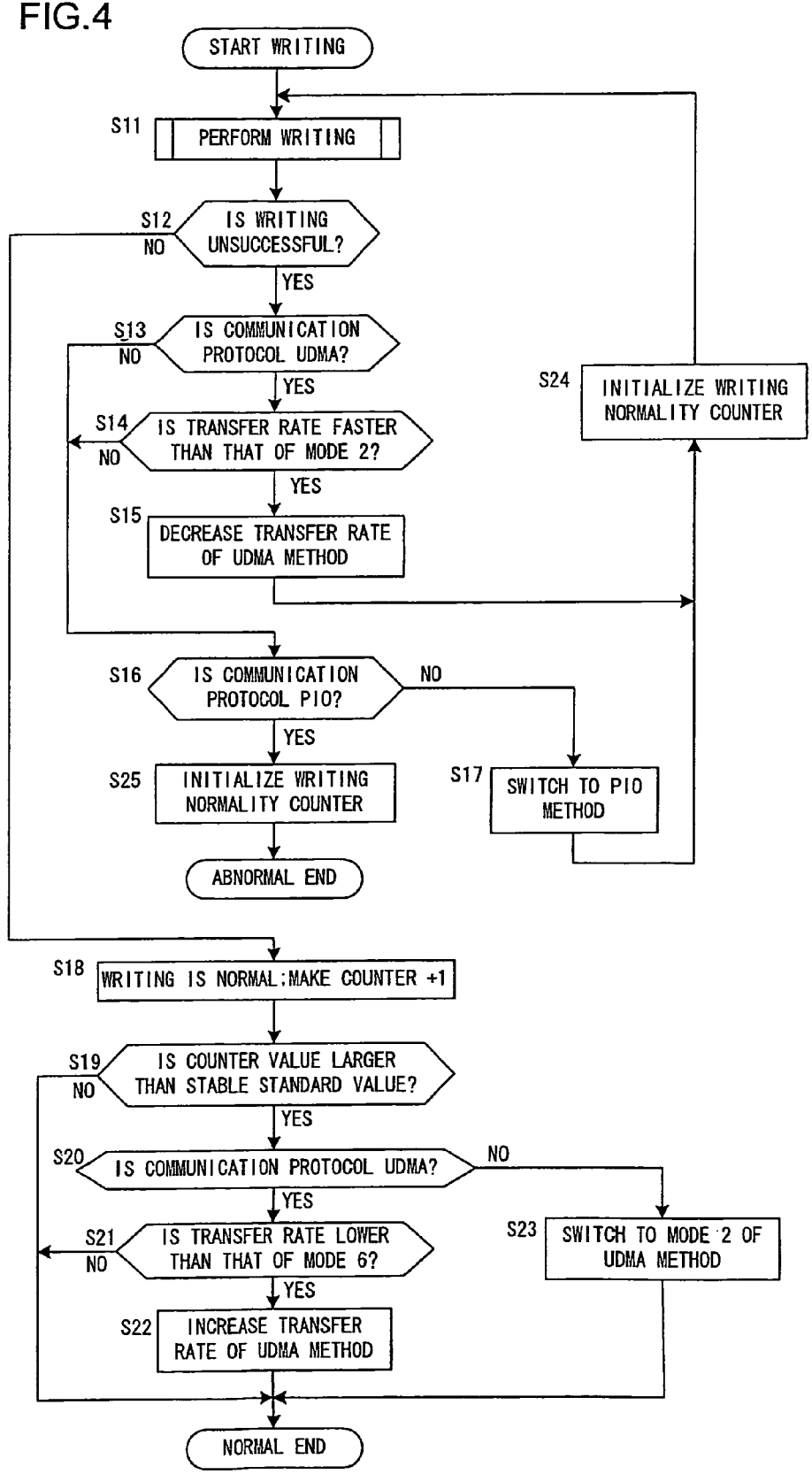
FIG. 4 is a flowchart illustrating communication control processing according to a second embodiment of the present invention.

FIG. 4 is a flowchart illustrating processing to write data into the memory card 250 as an example of the communication control processing according to the second embodiment of the present invention. The processing shown in FIG. 4 is performed in place of the processing shown in FIG. 3. The processing shown in FIG. 4 is different from the processing shown in FIG. 3 in steps S18 to S25 that are added to the processing shown in FIG. 4. Accordingly, description is focused on the differences.

In the step S18 to which the process proceeds when a negative judgment is made on the step S12 shown in FIG. 4, the CPU 211 adds 1 to a counter that counts times in which a judgment is made that the writing is normal (successful) (hereinafter, referred to as "writing normality counter") and advances the process to a step S19. In the step S19, the CPU 211 judges whether or not the count of the writing normality counter is larger than a predetermined value set in advance in the CPU 211 (hereinafter, referred to as "stable standard value"). The CPU 211 makes an affirmative judgment on the step S19 and advances the process to a step S20 when "(writing normality count)>(stable standard value)" is established. When "(writing normality count)>(stable standard value)" is not established, the CPU 211 makes a negative judgment on the step S19 and causes the processing shown in FIG. 4 to be ended. When the negative judgment is made on the step S19, the writing is normal, so that the data transfer to the memory card 250 is continued and data transfer of a next predetermined amount (in the present example, 128 Kbytes) is performed according to the same communication protocol and at the same transfer rate as ever.

In the step S20, the CPU 211 judges whether or not the current communication protocol is according to the UDMA method. When the current communication protocol is according to the UDMA method, the CPU 211 makes an affirmative judgment on the step S20 and advances the process to a step S21. The CPU 211 makes a negative judgment on the step S20 if it is judged that the current communication protocol is not according to the UDMA method and advances the process to a step S23.

In the step S21, the CPU 211 judges whether or not the current transfer rate according to the UDMA method is slower than that of Mode 6. When the current transfer rate is the same as the transfer rate of one of the Modes 2 to 5, the CPU 211 makes an affirmative judgment on the step S21 and advances the process to a step S22. The CPU 211 makes a negative judgment on the step S21 when the current transfer rate is the same as the transfer rate of Mode 6 and causes the processing shown in FIG. 4 to be ended. The writing is normal when the negative judgment is made on the step S21, so that the data transfer to the memory card 250 is continued and data transfer of a next predetermined amount (in the present example, 128 Kbytes) is performed according to the same communication protocol and at the same transfer rate as ever.

In the step S22, the CPU 211 sends an instruction to the card I/F 208 to increase the current transfer rate in the UDMA method by one rank and causes the processing shown in FIG. 4 to be ended. Since the writing is normal when the processing in the step S22 is performed, the data transfer to the memory card 250 is continued and data transfer of a next predetermined amount (in the present example, 128 Kbytes) is performed according to the same communication protocol and at a transfer rate by one rank higher than the current transfer rate.

In the step S23, the CPU 211 sends an instruction to the card I/F 208 to switch the communication protocol to one according to the UDMA method, which is a higher rate communication protocol, to select the transfer rate of Mode 2 and causes the processing shown in FIG. 4 to be ended. The writing is normal when the processing in the step S23 is performed, so that the data transfer to the memory card 250 is continued and data transfer of a next predetermined amount (in the present example, 128 Kbytes) is performed according to Mode 2 of the UDMA method. On the other hand, if it is judged that the writing is unsuccessful in the step S12, the process proceeds to a step S24 or a step S25 through each of the steps S12 to S17 thus far described. In each of the steps S24 and S25, the value of writing normality counter is initialized (that is, reset to 0). With this construction, no affirmative judgment is made on the step S19 unless the writing of data is "continuously" successful a predetermined number of times or more so that the count of the writing normality counter is more than a predetermined value. As a result, the transfer rate will be increased only when the processing of writing data is stably successful.

According to the second embodiment mentioned above, the following advantages besides the advantages of the first embodiment are obtainable.

(1) When the data transfer is continuously successful a predetermined number of times (stable standard value), the communication protocol is switched to the higher rate communication protocol if the lower rate communication protocol is currently used (step S23), so that data transfer can be achieved in a shorter period of time in a situation where the data transfer is stably successful.

When it is constructed such that the transfer rate is changeable in the lower rate communication protocol too, the communication protocol may be switched as follows. If the lower rate communication protocol is used at the time when the judgment whether or not the writing is successful is made and the transfer rate thereof is maximum, then the higher rate communication protocol is used in next data transfer.

(2) If the data transfer is continuously successful a predetermined number of times (stable standard value), the transfer rate is increased by one rank in next data transfer when the higher communication protocol is used (step S22). With this construction, data transfer can be achieved in a much shorter period of time in a situation where the data transfer is stably successful.

Third Embodiment

Figure 5:
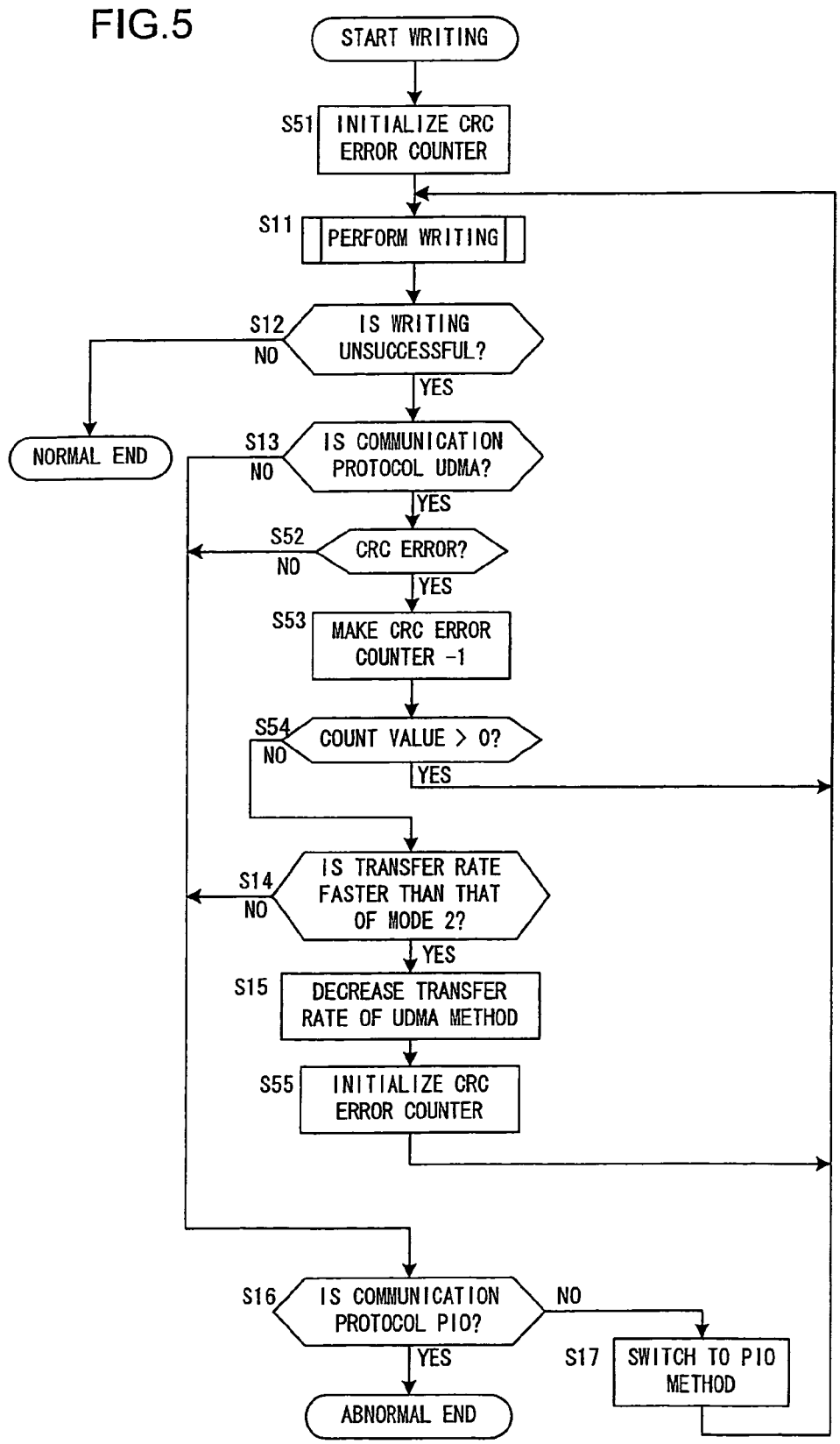
FIG. 5 is a flowchart illustrating communication control processing according to a third embodiment of the present invention.

FIG. 5 is a flowchart illustrating the communication control processing according to a third embodiment of the present invention. The processing shown in FIG. 5 is performed in place of the processing shown in FIG. 3 or 4. The processing shown in FIG. 5 is different from the processing shown in FIG. 3 in steps S51, S52 to S54, and S55 that are added to the processing shown in FIG. 3. Accordingly, description is focused on the differences.

In the step S51 shown in FIG. 5, the CPU 211 initializes the CRC error counter to a predetermined number of times of retry (for example, 3) preset in the CPU 211 and advances the process to the step S11. The CRC error counter is a counter of the type in which its count is decreased by one each time when it is judged that the abnormality of Mode 1 has occurred. The above-mentioned number of times of retry means a number of times of retry in which it is tried to write again the data of which the writing was unsuccessful by the same communication method (that is, according to the same communication protocol and at the same transfer rate).

In the step S52 to which the process proceeds when an affirmative judgment is made on the step S13, the CPU 211 judges whether or not a CRC error has occurred. The CPU 211 makes an affirmative judgment on the step S52 and advances the process to a step S53 when it is judged that abnormality of Mode 1 has occurred. When it is not judged that the abnormality of Mode 1 has occurred, the CPU 211 makes a negative judgment on the step S52 and advances the process to the step S16. It is when it is judged that the abnormality of Mode 2 or Mode 3 has occurred that the CPU 211 makes a negative judgment on the step S52.

In the step S53, the CPU 211 causes the CRC error counter to decrease 1 from its count and advances the process to the step S54. The CPU 211 judges whether the count of the CRC error counter is larger than 0. The CPU 211 makes an affirmative judgment on the step S54 and turns the process back to the step S11 when "(count value)>0" is established. That is, when the CPU 211 makes an affirmative judgment on the step S54, the CPU 211 performs again the writing of data, of which the writing has been unsuccessful in the step S11, according to the same communication protocol and at the same transfer rate. The reason why the communication method is not changed immediately after the judgment that the writing has been unsuccessful as mentioned above is that there is a possibility that a CRC error is detected only temporarily due to some external factor (for example, a shock that the camera receives during the communication) and trying the writing again will lead to a success.

On the other hand, when "(count value)>0" is not established, that is, when the writing of the data according to the same communication method is continuously unsuccessful a predetermined number of times of retry, the CPU 211 makes a negative judgment on the step S54 and advances the process to the step S14. When the CPU 211 makes a negative judgment on the step S54, the CPU 211 advances the process to judgment processing to judge whether the writing should be performed again by decreasing the transfer rate or by switching the communication protocol to the lower rate communication protocol.

In a step S55 that follows the step S15, the CPU 211 initializes the CRC error counter and turns the process back to the step S11. In this case, the writing is performed again by using the same communication protocol with decreasing the transfer rate.

According to the third embodiment mentioned above, the following advantages besides the advantages of the first embodiment are obtainable.

(1) It is constructed such that writing of data is performed again by the same communication method until the failure of data transfer that the handshake by the selected communication protocol is normal (communication is established) and only the transfer data is abnormal (abnormality of Mode 1 mentioned above) is continuously repeated a predetermined number of times (default value of CRC error counter) in the higher rate communication protocol. Therefore, no extreme measure is taken against a temporary abnormality for which it is in the nature of things unnecessary to decrease the transfer rate, so that communication of good quality can be performed. Note that it is constructed such that when the CRC error is continuously repeated a predetermined number of times, the data transfer is performed again at a lowered transfer rate (affirmative judgment in the step S15), so that there is a possibility that in the state where the data transfer is repeatedly unsuccessful, the data transfer will be successful in response to the decrease in transfer rate.

(2) In (1) mentioned above, it is constructed such that if the transfer rate with the higher rate communication protocol is minimum, the data transfer is tried again with switching the communication protocol to the lower rate communication protocol (the step s17). There is a possibility that in the state where the data transfer is repeatedly unsuccessful, the data transfer will be successful in response to the further decrease in transfer rate.

(3) It is constructed such that if an affirmative judgment is made on the failure of data transfer due to abnormality in Mode 2 or 3 when the higher rate communication protocol is used, the communication protocol is switched to the lower rate communication protocol and the data transfer is tried again (the step S17), so that there is a possibility that data transfer will be successful in response to the further decrease in transfer rate.

In the above description, explanation is made on, for example, data transfer between the memory card 250 and the memory 209. However, the memory card 250 may be a memory card of the type of, for example, a Compact Flash (trade mark) or a memory card of another type.

The present invention may be applied not only to data transfer between the memory card 250 and the memory 209 but also to data transfer between a recording medium such as a hard disk device and another recording medium such as a memory.

While in the above-mentioned description, the electronic camera 1 has been presented as an example of the electronic device, the present invention is also applicable to video cameras, cellular phones, PDA, and so on.

Figure 6:
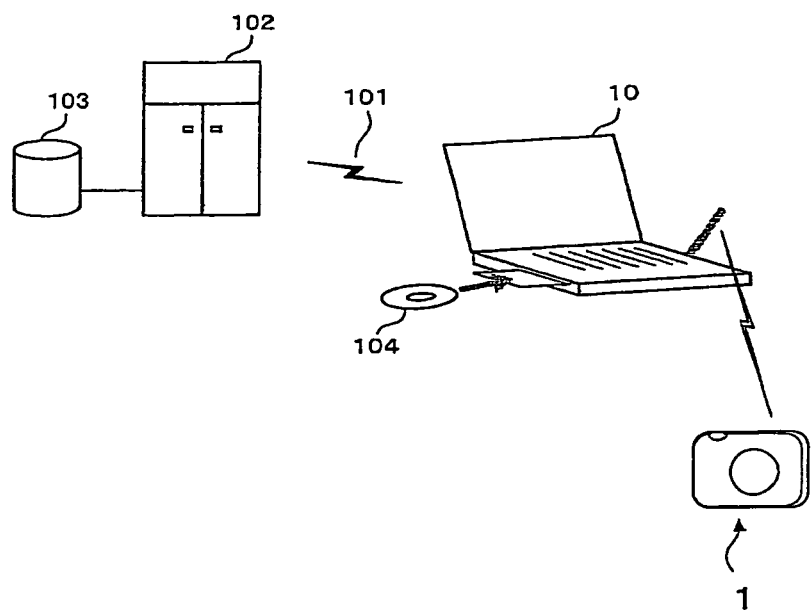
FIG. 6 is a diagram illustrating by an example of a manner in which a computer program product that causes a computer to perform the communication control processing according to any of the first to the third embodiments is provided.

As shown in FIG. 6, the computer program that causes a computer to execute the communication control processing shown in any of FIGS. 3 to 5 need not be implemented in the electronic camera 1 from the beginning but may be implemented by transferring the program from a personal computer 10 in which it is stored to the electronic camera 1. For example, a recording medium 104 such as a CD-ROM in which a computer program is stored is set in the personal computer 10. The personal computer 10 reads the computer program from the recording medium 104 and transfers it to the electronic camera 1 through wired or wireless LAN or the like.

It would also be acceptable to construct such that the personal computer 10 downloads the computer program as data signals via the communication line 101 such as a network and transfers them to the electronic camera 1. In this case, the program is stored in advance in a hard disk device 103 in a server (computer) 102 connected to the communication line 101. As mentioned above, the computer program that causes the computer to execute the communication control processing can be provided as a computer program product that is furnished in various forms such as provision of the recording medium 104 having stored therein the computer program and data signals through the communication line 101.

The present invention is not limited to the constructions described in the above-mentioned embodiments so far as the function or functions by which the present invention is featured are not damaged.

What is claimed is:

1. An electronic device comprising:
a data transfer unit that transfers data between a first recording medium and a second recording medium;
an indication unit that indicates to the data transfer unit a communication protocol and a data transfer rate to be used in data transfer;
a judgment unit that judges whether or not the data transfer is successful; and
a control unit that controls the indication unit to indicate the communication protocol and the data transfer rate to be used in the data transfer, after the judgment whether or not the data transfer is successful, based on the communication protocol used in the data transfer, the data transfer rate used in the data transfer, and the judgment whether or not the data transfer is successful, wherein the communication protocol to be used in the data transfer includes a higher rate communication protocol and a lower rate communication protocol that performs the data transfer in a transfer rate lower than that of the higher rate communication protocol, at least one of the higher rate communication protocol and the lower rate communication protocol is adapted to be changeable with respect to the data transfer rate, and the control unit controls the indication unit to increase the data transfer rate without changing the communication protocol when it is judged by the judgment unit that the data transfer with the communication protocol of which the data transfer rate is made changeable is successful.

2. The electronic device according to claim 1, wherein the control unit controls the indication unit to decrease the data transfer rate without changing the communication protocol when it is judged by the judgment unit that the data transfer with the communication protocol of which the data transfer rate is made changeable is unsuccessful.

3. The electronic device according to claim 2, wherein the control unit controls the indication unit to change the higher rate communication protocol to the lower rate communication protocol when the data transfer is performed at a minimum data transfer rate of the higher rate communication protocol of which the data transfer rate is made changeable and it is judged by the judgment unit that the data transfer is unsuccessful.

4. The electronic device according to claim 1, wherein the control unit controls the indication unit to change the lower rate communication protocol to the higher rate communication protocol when the data transfer is performed at a maximum data transfer rate of the lower rate communication protocol of which the data transfer rate is made changeable and it is judged by the judgment unit that the data transfer is successful.

5. An electronic device comprising:

a data transfer unit that transfers data between a first recording medium and a second recording medium;

an indication unit that indicates to the data transfer unit a communication protocol and a data transfer rate to be used in data transfer;

a judgment unit that judges whether or not the data transfer is successful; and a control unit that controls the indication unit to indicate the communication protocol and the data transfer rate to be used in the data transfer, after the judgment whether or not the data transfer is successful, based on the communication protocol used in the data transfer, the data transfer rate used in the data transfer, and the judgment whether or not the data transfer is successful, wherein the communication protocol to be used in the data transfer includes a higher rate communication protocol and a lower rate communication protocol that performs the data transfer in a transfer rate lower than that of the higher rate communication protocol, at least one of the higher rate communication protocol and the lower rate communication protocol is adapted to be changeable with respect to the data transfer rate, and the control unit controls the indication unit to increase the data transfer rate when a judgment by the judgment unit that the data transfer is successful is continuously made a predetermined number of times.

6. The electronic device according to claim 5, wherein the control unit controls the indication unit to decrease the data transfer rate without changing the communication protocol when it is judged by the judgment unit that data transfer with the communication protocol of which the data transfer rate is made changeable is unsuccessful.

7. The electronic device according to claim 6, wherein the control unit controls the indication unit to change the higher rate communication protocol to the lower rate communication protocol when the data transfer is performed at a minimum data transfer rate of the higher rate communication protocol of which the data transfer rate is made changeable and it is judged by the judgment unit that the data transfer is unsuccessful.

8. An electronic device comprising:

a data transfer unit that transfers data between a first recording medium and a second recording medium;

an indication unit that indicates to the data transfer unit a communication protocol and a data transfer rate to be used in data transfer;

a judgment unit that judges whether or not the data transfer is successful; and a control unit that controls the indication unit to indicate the communication protocol and the data transfer rate to be used in the data transfer, after the judgment whether or not the data transfer is successful, based on the communication protocol used in the data transfer, the data transfer rate used in the data transfer, and the judgment whether or not the data transfer is successful, wherein the communication protocol to be used in the data transfer includes a higher rate communication protocol and a lower rate communication protocol that performs the data transfer in a transfer rate lower than that of the higher rate communication protocol, at least one of the higher rate communication protocol and the lower rate communication protocol is adapted to be changeable with respect to the data transfer rate, the control unit controls the indication unit to increase the data transfer rate without changing the communication protocol when it is judged by the judgment unit that the data transfer with the communication protocol of which the data transfer rate is made changeable is successful, the control unit controls the indication unit to redo the data transfer according to the same communication protocol and at the same transfer rate as the communication protocol and the transfer rate at the time when it is judged by the judgment unit that the data transfer is unsuccessful because the judgment unit has detected an error upon a cyclic redundancy check, and the control unit controls the indication unit to decrease the data transfer rate or to change the communication protocol to the lower rate communication protocol when it is judged by the judgment unit that a judgment that the data transfer is unsuccessful is continuously made a predetermined number of times.

9. An electronic camera comprising:

components of the electronic device according to claim 1; and an image-capturing unit that captures an image of a subject to obtain image data and outputs the image data.

10. A non-transitory computer-readable program product containing a program for controlling data transfer, the program comprising:

a data transfer instruction for performing data transfer between a first recording medium and a second recording medium;

an indication instruction for indicating a communication protocol and a data transfer rate to be used in the data transfer, the communication protocol to be used in the data transfer including a higher rate communication protocol and a lower rate communication protocol that performs the data transfer in a transfer rate lower than that of the higher rate communication protocol, at least one of the higher rate communication protocol and the lower rate communication protocol being adapted to be changeable with respect to the data transfer rate;

a judgment instruction for judging whether or not the data transfer is successful; and a control instruction for controlling the indication instruction to increase the data transfer rate without changing the communication protocol when it is judged by the judgment instruction that the data transfer with the communication protocol of which the data transfer rate is made changeable is successful.

11. A non-transitory computer-readable program product containing a program for controlling data transfer, the program comprising:

a data transfer instruction for performing data transfer between a first recording medium and a second recording medium;

an indication instruction for indicating a communication protocol and a data transfer rate to be used in data transfer;

a judgment instruction for judging whether or not the data transfer is successful; and a control instruction for controlling the indication instruction to indicate the communication protocol and the data transfer rate to be used in the data transfer, after the judgment whether or not the data transfer is successful, based on the communication protocol used in the data transfer, the data transfer rate used in the data transfer, and the judgment whether or not the data transfer is successful, wherein the communication protocol to be used in the data transfer includes a higher rate communication protocol and a lower rate communication protocol that performs the data transfer in a transfer rate lower than that of the higher rate communication protocol, at least one of the higher rate communication protocol and the lower rate communication protocol is adapted to be changeable with respect to the data transfer rate, and the control instruction controls the indication instruction to increase the data transfer rate when it is judged by the judgment instruction that the data transfer is successful is continuously made a predetermined number of times.

12. A non-transitory computer-readable program product containing a program for controlling data transfer, the program comprising:

a data transfer instruction for performing data transfer between a first recording medium and a second recording medium;

an indication instruction for indicating a communication protocol and a data transfer rate to be used in data transfer;

a judgment instruction for judging whether or not the data transfer is successful; and a control instruction for controlling the indication instruction to indicate the communication protocol and the data transfer rate to be used in the data transfer, after the judgment whether or not the data transfer is successful, based on the communication protocol used in the data transfer, the data transfer rate used in the data transfer, and the judgment whether or not the data transfer is successful, wherein the communication protocol to be used in the data transfer includes a higher rate communication protocol and a lower rate communication protocol that performs the data transfer in a transfer rate lower than that of the higher rate communication protocol, at least one of the higher rate communication protocol and the lower rate communication protocol is adapted to be changeable with respect to the data transfer rate, the control instruction controls the indication instruction to increase the data transfer rate without changing the communication protocol when it is judged by the judgment instruction that the data transfer with the communication protocol of which the data transfer rate is made changeable is successful, the control instruction controls the indication instruction to redo the data transfer according to the same communication protocol and at the same transfer rate as the communication protocol and the transfer rate at the time when it is judged by the judgment instruction that the data transfer is unsuccessful because the judgment instruction has detected an error upon a cyclic redundancy check, and the control instruction controls the indication instruction to decrease the data transfer rate or to change the communication protocol to the lower rate communication protocol when it is judged by the judgment instruction that a judgment that the data transfer is unsuccessful is continuously made a predetermined number of times.

\* \* \* \* \*